Jan. 9, 1968 J. C. ROBERTSON 3,363,236
DIGITAL COMPUTER HAVING LINKED TEST OPERATION
Filed Sept. 2, 1965
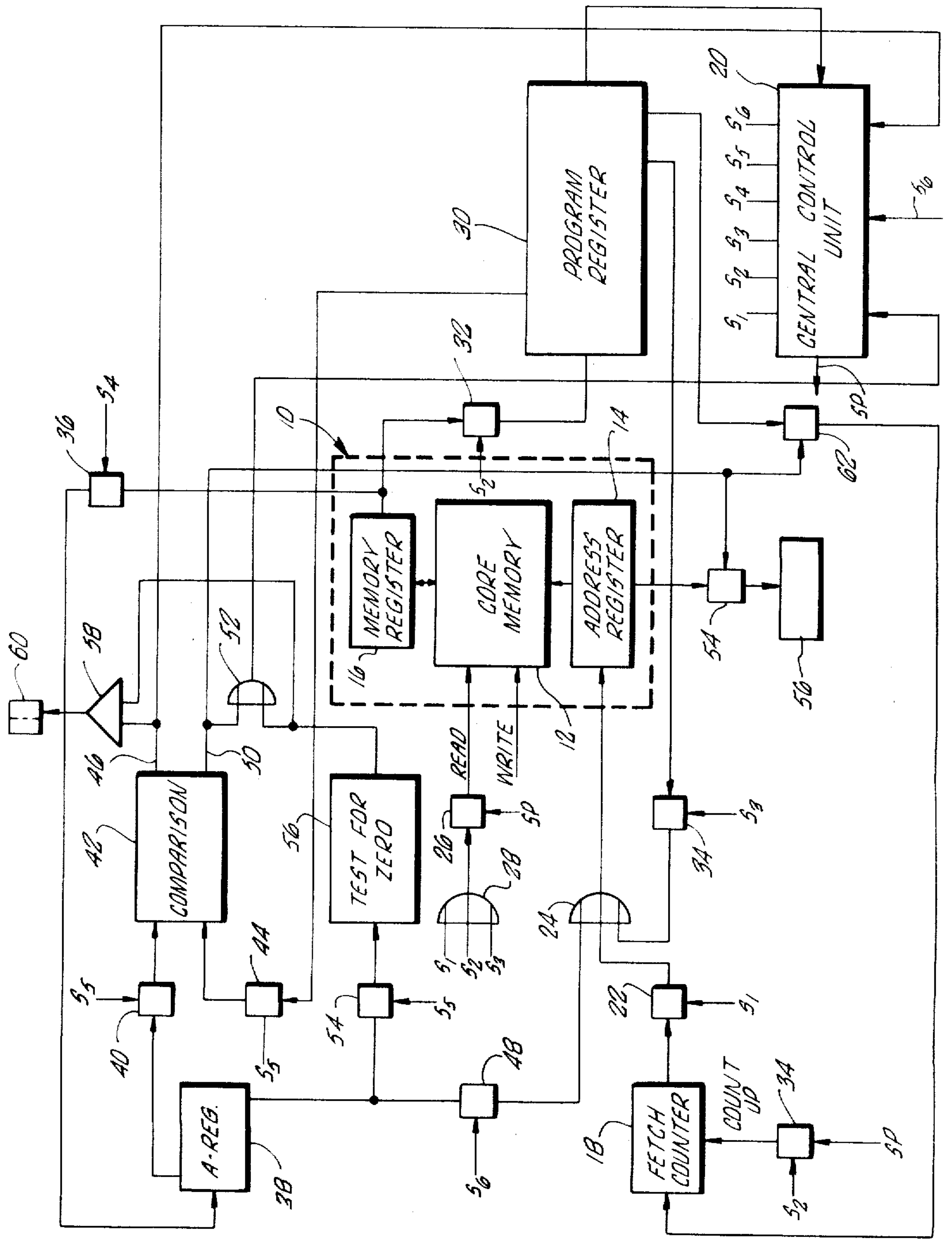
INVENTOR.
JAMES C. ROBERTSON
BY
Christie, Parker & Hale
ATTORNEYS.

United States Patent Office 3,363,236

Patented Jan. 9, 1968

3,363,236

DIGITAL COMPUTER HAVING LINKED TEST OPERATION

James C. Robertson, Arcadia, Calif., assignor to Burroughs Corporation, Detroit, Mich., a corporation of Michigan Filed Sept. 2, 1965, Ser. No. 484,681
6 Claims. (Cl. 340—172.5)

This invention relates to high speed digital computers and, more particularly, is concerned with a computer having an operator for testing a linked sequence of words in memory against specified criteria.

It has been found desirable in certain circumstances to be able to test a number of words in memory against some criteria and do so at a high speed with a single program instruction. For example, with the development of the interrupt system for computer hardware, there is the need to decode the source of the interrupt by a control program. Since a number of interrupt conditions may occur in the computer at the same time and because only one interrupt condition can be dealt with at a time, it is necessary to establish some priority of examination of the source of the interrupt condition. In copending application Ser. No. 232,016, filed Oct. 22, 1962, in the name of William A. Logan et al. and assigned to the same assignee as the present invention, there is described an interrupt system in which the priority is established by a wired-in priority circuit. While such an arrangement provides the maximum in speed of operation, it lacks flexibility since it can not be readily changed. Other computer systems have provided alternative arrangements in which the interrupt indications are examined by a stored program in any arbitrary order established by the programmer, permitting the maximum flexibility of priority assignment. However, in systems where a sizable number of possible interrupt conditions must be examined, programming and execution time may become excessively long.

The present invention provides an improved arrangement for examining, for example, a plurality of interrupt conditions which combines the speed of the wired-in priority logic but retains the flexibility of a fully programmed interrupt sequence.

In brief, the improved operation of the present invention is achieved by providing an instruction or operator which tests a sequence of linked words in memory. Each word, for example, stores an indication of a particular interrupt condition for a preassigned module of the computer system, such as the result of an input/output operation of a specified input/output channel or the like. Each word is brought out of memory starting with the address identified by the instruction. A test is made on each word brought out of memory to determine the interrupt condition. Each word in turn is linked by an address portion of the word to the next word in the sequence. If a particular word "fails" the test, the operation is interrupted, the address is stored, and the next program instruction is accessed. However, if a particular word "passes" the established test, the link address portion of the word is used to bring out the next interrupt indicator word from memory and the test is repeated. In this way, all the interrupt indicator words can be tested in a preassigned sequence which can be readily modified, and the linked tests can be completed to locate a particular interrupt condition by a single instruction.

For a more complete understanding of the invention, reference should be made to the accompanying drawing wherein the single figure is a schematic block diagram of one embodiment of the present invention.

Referring to the figure in detail, the numeral 10 indicates generally a memory unit which, by way of example, may include a core memory 12 which is addressed by the contents of an address register 14. Words are transferred in and out of the core memory 12 through a memory register 16. Program instructions are stored in the core memory 12 in sequential locations. The instructions are brought out of memory in response to a fetch counter 18, which is counted up following the execution of each instruction so as to address the next instruction in the sequence.

Operation of the computer is under the control of a central control unit 20. The central control unit 20 typically includes a clock pulse source and a sequence counter by means of which the central control unit is caused to step through a series of sequential steps in which output control lines, designated $S_1$ through $S_6$, are energized in controlled sequence. Sequence pulses designated SP are also generated at the time the control unit changes from one control state to the next. An example of a suitable central control circuit is described in Patent No. 3,001,708.

Initially, the central control unit is in the $S_1$ state during which state the next instruction is brought out of the core memory 12 and inserted into the memory register 16. To this end, the contents of the fetch counter 18 are transferred to the address register 14 through a gate 22 during the $S_1$ state and through a logical OR circuit 24. The SP generated at the end of the $S_1$ state reads the addressed instruction in the core memory 12 into the memory register 16 by being gated to the Read input of the core memory 12 through a gate 26. The gate 26 is operated during the $S_1$ state, which state is applied to the gate 26 through a logical OR circuit 28.

At the completion of the $S_1$ state, the central control unit 20 advances to the $S_2$ state. During the $S_2$ state, the instruction in the memory register 16 is transferred to a program register 30 by means of a gate 32. This completes the instruction fetch operation and the fetch counter 18 is counted up by the sequence pulse generated at the end of the $S_2$ state, the SP being passed by a gate 34.

The instruction in the program register may be any one of the instructions which the computer is designed to accommodate, in a manner well known in the prior art. The present invention involves a unique instruction, which may be called a "linked test" operator. Typically, the instruction includes a first group of bits which identify the particular operator. These bits are applied to the central control unit 20 where they are decoded in conventional manner to control the sequence of operations of the computer in executing the instruction. The second portion of the linked test instruction includes one or more bits which provide a mask against which the interrupt indicators are each compared. A third group of bits in the linked test instruction establishes the address of the first interrupt indicator or other word in the core memory which is to be tested by the instruction.

When the linked test operator is encountered in the program register 30 and decoded, the central control unit 20 establishes the $S_3$ state in which the address portion of the instruction in the program register 30 is transferred by means of a gate 34 to the address register 14. The SP generated at the end of the $S_3$ state is applied to the gate 26 along with the $S_3$ state to cause the word addressed in the core memory 12 to be transferred into the memory register 16. When the central control unit advances to the $S_4$ state, the selected word is transferred from the memory register 16 through a gate 36 to an A-register 38. Where, for example, the linked test operator is being used in testing interrupt conditions, the word read out of the core memory may be a result descriptor or an interrupt indicator associated with a particular piece of equipment, such as an input/output channel, another processor or the like. Bits in this word are set to indicate the particular interrupt condition, such as the completion of a readout by an input/output channel, a parity error in the transfer of information by the particular input/output channel, an overflow condition in the processor or any number of possible interrupt conditions which may exist within the computer. The specific manner in which these bits are set in the descriptor word in the core memory in response to an interrupt condition forms no part of the present invention.

Preselected bits in the word stored in the A-register 38 are then compared against the bits in the mask portion of the instruction in the program register 30. This is accomplished by simultaneously applying the selected bits in the A-register 38 through a gate 40 to one input of a comparison circuit 42 together with the mask bits from the program register 30 applied through a gate 44 to a second input of the comparison circuit 42. A comparison may be on one or more bits to determine if the bits compared are equal or unequal.

If the comparison circuit 42 indicates that the selected bits in the word in the A-register 38 compare with the mask bits of the instruction in the program register 30, an "equal" indication is provided by an output signal on the line 46, which output is applied to the central control unit 20 to set the central control unit to the $S_6$ state.

During the $S_6$ state, a portion of the word in the A-register is transferred by means of a gate 48 to the address register 14 and the SP at the completion of the $S_6$ state is applied through the gate 26 causing the newly addressed word to be transferred from the core memory 12 into the memory register 16. In this manner, each word representing an interrupt indicator addresses the next interrupt indicator word in sequence in the core memory. The sequence can be readily altered to conform to any priority of interrupts merely by modifying the link address. The $S_6$ state is also used to reset the central control unit back to the $S_4$ state in which the next interrupt indicator word now stored in the memory register 16 is transferred by the gate 36 into the A-register 38. The comparison is now repeated during the $S_5$ state. In this manner, the interrupt indicator words are brought out of memory in the sequence determined by the link addresses and each word is compared with the criteria established by the mask bits of the instruction in the program register 30. The test continues either until the last word in the linked sequence has been read out of the core memory or until the comparison circuit 42 indicates that the test fails because the bits being compared are not equal.

In the latter instance, a signal is provided on the "unequal" output line 50 from the comparison circuit 42. This signal is applied through a logical OR circuit 52 to the central control unit 20 to reset the central control unit back to the $S_1$ state so that the next insrucion can be fetched from the core memory 12. At the same time, the address of the word which has failed the test is stored by transferring the address from the address register 14 through a gate 54 to a storage register 56. The address of the interrupt indicator is then available to subsequent instructions in the control program which may provide a fix-up routine for the particular interrupt condition.

If the final word in the list is tested and passes the test, the linked test operator instruction is terminated. To this end, the address portion of the A-register is coupled through a gate 55 during the $S_5$ state to a test-for-zero circuit 57. A zero address is used to flag the condition that no more words are provided in the linked sequence. Thus the output of the test-for-zero circuit 57 will be true when the last word in the sequence is placed in the A-register 38. The output of the test-for-zero circuit 57 is applied to a logical AND circuit 58 together with the "equal" indication line 46 from the comparison circuit 42. The output of the AND circuit 58 sets a flip-flop 60 to indicate to subsequent instructions that all of the words in the linked sequence passed the comparison test of the linked test operator. The output of the test-for-zero circuit 57 is also coupled through the logical OR circuit 52 back to the central control unit 20 to re-establish the $S_1$ state for fetching the next instruction from memory.

From the above description, it will be recognized that a circuit is provided by which a sequence of words which are linked together by address portions of the words can be tested for some predetermined condition. The sequence in which the words are brought out of memory and tested can be readily modified by altering the address portion of the words. While the circuit has been described as making a comparison between a group of bits in the instruction and a group of bits in each of the words read out of memory, the test may be simply whether or not a particular bit in the word has been set to 1, for example. Likewise, the circuit may be arranged such that if the comparison test fails, rather than merely fetching the next instruction in the sequence identified by the fetch counter 18, a branch operation may be incorporated as part of the linked test operator. For example, the "unequal" output 50 from the comparison circuit 42 might be applied to a gate 62 by which a portion of the instruction in the program register 30 is loaded in the fetch counter 18. In this way, the computer is caused to branch to a different instruction whenever the comparison test fails.

What is claimed is:

1. A computer comprising memory means for storing a plurality of digitally coded words, a first register for storing instructions, means for transferring an instruction from the memory means to the first register, a second register, means responsive to a portion of the word stored in the first register for addressing and transferring a selected word from the memory means to the second register, the word being selected from an address specified as part of the instruction in the first register, means for comparing a selected portion of the word in the first register with the word in the second register, means responsive to a first condition of the comparing means for selecting and reading out a word from memory into the second register including means for addressing the word in memory from an address specified by a portion of the word in the second register, and means responsive to a second condition of the comparing means for storing the address of the last word read out of memory into the second register and fetching the next instruction from the memory to the first register.

2. A computer comprising memory means for storing a plurality of digitally coded words, a first register for storing instructions, means for transferring an instruction from the memory means to the first register, a second register, means responsive to a portion of the word stored in the first register for addressing and transferring a selected word from the memory means to the second register, the word being selected from an address specified as part of the instruction in the first register, means responsive to a predetermined first condition of selected digits of the word in the second register for selecting and reading out a new word from memory into the second register including means for addressing the word in memory from an address specified by a portion of the word in the second register, and means responsive to a predetermined second condition of selected digits of the word in the second register for terminating the operation and transferring another instruction from the memory means to the first register.

3. A computer comprising memory means for storing a plurality of digitally coded words, a first register for storing instructions, means for transferring an instruction from the memory means to the first register, a second register, means responsive to a portion of the word stored in the first register for transferring a selected word from the memory means to the second register, the word being selected from an address specified as part of the instruction in the first register, means for comparing a selected portion of the word in the first register with the word in the second register, means responsive to a first condition of the comparing means for selecting and reading out a word from memory into the second register including means for addressing the word in memory from an address specified by a portion of the word in the second register, means responsive to the first condition of the comparing means and a predetermined condition of the address portion of the word in the second register for initiating transfer of another instruction word from the memory means to the first register, and means responsive to a second condition of the comparing means for initiating transfer of another instruction from the memory means to the first register.

4. A computer comprising memory means for storing a plurality of digitally coded words, a first register for storing instructions, means for transferring an instruction from the memory means to the first register, a second register, means responsive to a portion of the word stored in the first register for transferring a selected word from the memory means to the second register, the word being selected from an address specified as part of the instruction in the fisrt register, means for comparing a selected portion of the word in the first register with the word in the second register, means responsive to a first condition of the comparing means for selecting and reading out a word from memory into the second register including means for addressing the word in memory from an address specified by a portion of the word in the second register, and means responsive to a second condition of the comparing means for initiating transfer of another instruction from the memory means to the first register.

5. A computer comprising memory means for storing a plurality of digitally coded words, a first register for storing instructions, means for transferring an instruction from the memory means to the first register, a second register, means responsive to a portion of the word stored in the first register for transferring a selected word from the memory means to the second register, means for comparing a selected portion of the word in the first register with the word in the second register, means responsive to a first condition of the comparing means for selecting and reading out a word from memory into the second register, means responsive to a second condition of the comparing means for initiating transfer of a new instruction from the memory means to the first register.

6. In a computer in which stored digitally coded instructions are placed in a program register and executed in sequence, apparatus responsive to a particular coded instruction in the program register comprising addressable storage means for storing a plurality of digitally coded words, means for selectively addressing a word from said storage means in response to address information in the instruction in said register, means including a register for receiving the selected word from the storage means, means responsive to a predetermined condition of a first group of bits in the word stored in the register for replacing the word with another word from the storage means including means for addressing the storage means in response to a second group of bits in the word stored in the register, whereby each word placed in the register is replaced by another word addressed by the previous word, and means responsive to a different condition of the first group of bits for initiating the transfer of a new instruction into the program register.

References Cited

UNITED STATES PATENTS

| | | | |
|---|---|---|---|
| 3,286,236 | 11/1966 | Logan et al. | 340—172.5 |
| 3,293,610 | 12/1966 | Epperson et al. | 340—172.5 |
| 3,333,252 | 7/1967 | Shimabukuro | 340—172.5 |

PAUL J. HENON, *Acting Primary Examiner.*

R. B. ZACHE, *Assistant Examiner.*